DIRIGIBLE CRAFT CONTROL APPARATUS

Filed May 24, 1965 3 Sheets-Sheet 1

INVENTOR.
THOMAS S. CHANAK
LESTER D. EDINGER
RUSSELL C. HENDRICK
BY Gordon Reed
ATTORNEY

DIRIGIBLE CRAFT CONTROL APPARATUS

Filed May 24, 1965 3 Sheets-Sheet 2

| FLIGHT CONDITION | $Z_a$ | LOGIC OUTPUT |
|---|---|---|
| HIGH $M_\delta$ | $Z_a > Z_{a_1}$ | $e_{11}+$, $e_{22}+$ |
| MEDIUM $M_\delta$ | $Z_{a_1} > Z_a > Z_{a_2}$ | 0 , $e_{22}+$ |
| LOW $M_\delta$ | $Z_a < Z_{a_2}$ | 0 , 0 |

INVENTOR.
THOMAS S. CHANAK
LESTER D. EDINGER
RUSSELL C. HENDRICK

Gordon Reed
ATTORNEY

INVENTOR.
THOMAS S. CHANAK
LESTER D. EDINGER
RUSSELL C. HENDRICK
Gordon Reed
ATTORNEY

United States Patent Office 3,345,018

Patented Oct. 3, 1967

1

3,345,018

DIRIGIBLE CRAFT CONTROL APPARATUS

Thomas S. Chanak, Minneapolis, Lester D. Edinger, White Bear Lake, and Russell C. Hendrick, Fridley, Minn., assignors to Honeywell Inc., Minneapolis, Minn., a corporation of Delaware Filed May 24, 1965, Ser. No. 458,118

16 Claims. (Cl. 244—77)

ABSTRACT OF THE DISCLOSURE

The disclosure pertains to adaptive autopilot for aircraft. An adaptive autopilot is one that adjusts itself for change in condition such as flight condition, e.g., air speed or altitude. Many adaptable autopilots continuously adjust itself for change in flight condition. The subject disclosure is to the type of adaptable autopilot that does not continuously adjust itself for changes in flight conditions but divides the flight regime such for example for air speed into three portions, and the autopilot system gain is held constant during each of the three portions, but the gain is different for each of the three portions.

Figure 1:
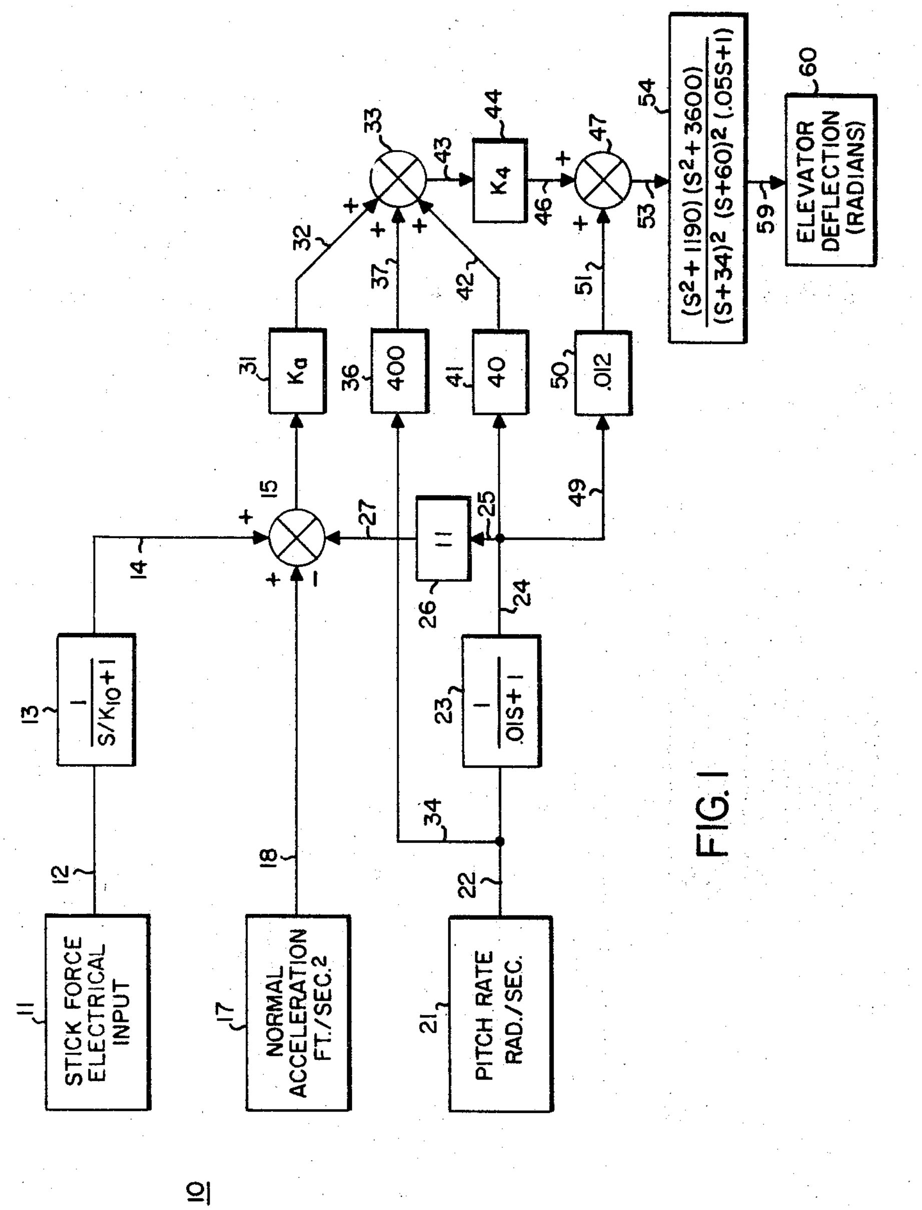

Thus the effectiveness of the control surface of the aircraft is not maintained substantially constant herein by continuously varying the gain of the system.

While control surface effectiveness is the quantity desired to be controlled, this quantity is difficult of measurement. Because of this difficulty, the normal force equation is utilized to control the gain of the system in the three regions mentioned. Thus the actual normal acceleration of the aircraft is sensed as is also the angle of attack of the aircraft and from the angle of attack there is obtained a desired value of normal acceleration. A comparison is made between the desired normal acceleration and actual acceleration and if the actual acceleration exceeds the desired magnitude, the gain is reduced. Conversely when the air speed decreases for example rather than increases, the gain will be increased as the air speed is reduced.

The division of the flight regime into three regions above is obtained by two predetermined values of the lift force coefficient due to change in angle of attack. The gain range selected is obtained by comparison of these predetermined values of the lift force coefficients $Z\alpha_1$, $Z\alpha_2$, and a measured value of the lift force coefficient, $Z\alpha$.

This invention relates to flight control systems for aircraft or dirigible craft. Automatic flight control systems have become more sophisticated as aircraft of increased performance capabilities have been developed. Increased speed ranges of these aircraft or widening of the airspeed and altitude regime have brought about wide variations in the free aircraft short-period frequency characteristics. The natural damping of the aircraft short-periods modes has decreased as higher altitudes have been achieved. Aerodynamic design trends for aircraft have led to more flexible structures and more pronounced bending effects.

With respect to automatic flight control systems for aircraft to aid in damping and controlling the craft, gain-scheduled and self-adaptive aircraft flight systems have been developed to meet this need for greater sophistication in flight controls. By varying aircraft flight control system parameters, the desired performance of aircraft may be achieved over a broad range of speeds and altitudes.

However, flight systems of the above sort developed to date have been, for the most part, tailored to specific aircraft designs. Expensive development programs have been required to achieve satisfactory performance for each new aircraft design. Maintenance of this equipment (especially aboard aircraft carriers) is complicated because

2 the maintenance personnel must be familiar with several different automatic flight control system types for different aircraft. Logistic problems are likewise compounded by the requirement for stocking several families of spare parts for different types of flight control systems. The high reliability which could be achieved by continuous improvement of automatic flight control system component designs for one control system is not realized because each new aircraft requires new types of equipment. Cost of these systems is high because they are produced in relatively small quantities commensurate with the number of particular airframes required or supplied.

Many advantages would result if a completely adaptable automatic flight control system could be realized with sufficient versatility so that it could fulfill the control requirements of generally similar aircraft types. These advantages include lower development and production costs, improved reliability, reduced logistic requirements, and reduced training requirements for both pilots and maintenance crews. These factors would result in greater automatic flight control system utility and availability and reduced continuous ownership as well as original costs.

Powerful synthesis techniques have been developed recently so that control laws may be defined that are applicable to the control of a class of aircraft types. In spite of differences in the primary or manually operated control systems between aircraft types, a large degree of commonality of automatic flight control system equipment may be achieved. A completely adaptable automatic flight control system based on novel concepts is disclosed herein. The necessary constraints and integration of the system with specific aircraft will be defined.

Thus, an object of this invention is to provide an improved on board stabilization system for aircraft by means of which the magnitude of the control surface displacement may be continuously coordinated for variable aircraft parameters.

A further object of the invention is to provide, by measurement of angle of attack $\alpha$, and normal acceleration $N_a$, an identification of the magnitude of lift-curve slope on the aircraft. By this specification, the desired control system parameters can be set at their proper values.

A further object of the present invention is to provide an improved navigation system for aircraft by means of which maneuvers of the craft may be coordinated in accordance with the flight conditions of lift-curve slope.

A further object of the present invention is to provide an improved navigation system for aircraft by means of which system the maneuvers of the craft in response to a command may be continuously coordinated for various angles of attack of the aircraft.

A further object of the present invention is to provide an improved stabilization system for aircraft by means of which the maneuvering of the craft may be coordinated in accordance with the normal acceleration of the craft.

A further object of the present invention is to provide an improved stabilization system for aircraft by means of which maneuvers of the craft by operating attitude changing means thereof through an automaic pilot may be continuously coordinated for different values of angle of attack and normal acceleration of the aircraft.

Figure 2:
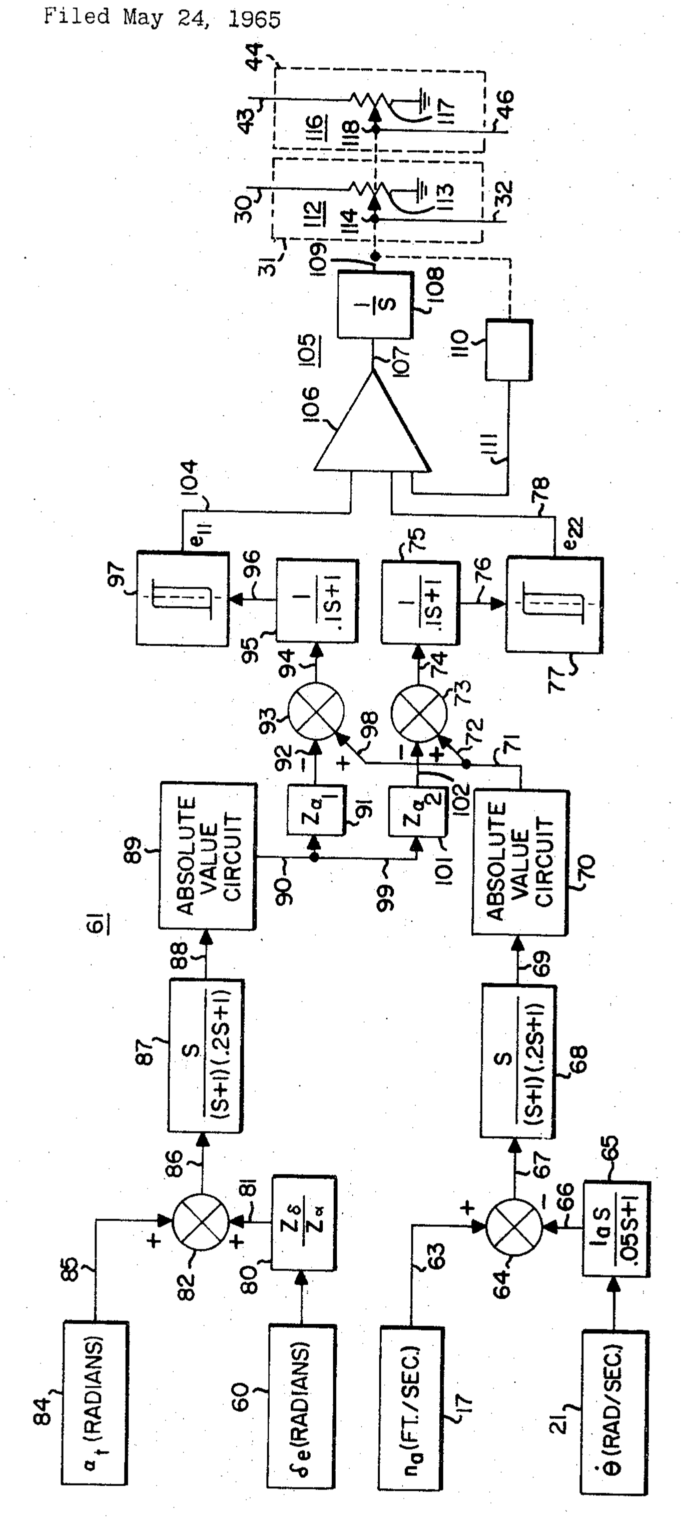
Figure 3:
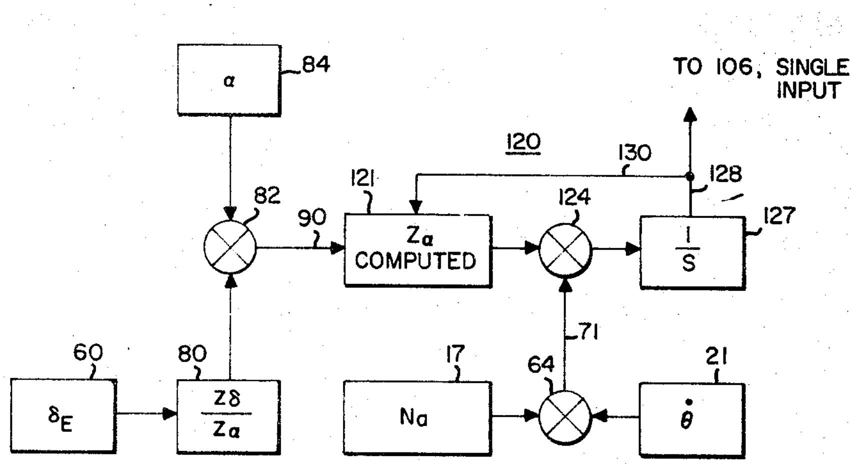

The above and other objects and advantages of the present invention, not enumerated above, will become clearly evident from the following detailed description of a preferred embodiment thereof illustrated in the accompanying drawings, wherein:

FIGURE 1 in block form shows the novel pitch stability augmentation system;

FIGURE 2 shows a gain control arrangement, termed flight condition identifier, for modifying gains in the arrangement of FIGURE 1; and FIGURE 3 is a modification of FIGURE 2.

THE PROPOSED SYSTEM

The concept proposed as the basis to the completely or universal adaptable system for various types of aircraft uses a set of discrete control laws, each applicable to a broad portion or division of the total flight envelope. Based on the aircraft data, a division of the envelope into three portions or subdivisions is employed according to the aircraft control surface effectiveness range. Within each portion of the envelope, a fixed-parameter controller that controls operation of the surface is synthesized, thereby providing both performance and simplicity.

Along with the division of the flight envelope, a simple and reliable device for flight condition identification is proposed. Its design is based on solution of the short-period normal force equation for aircraft, effected primarily by comparing perturbation values i.e. slight changes, of angle-of-attack and the resulting normal acceleration. Evaluation is performed accurately for both pilot commands and aerodynamic disturbances in the presence of realistic magnitudes of sensor noise.

The flight condition identifier is proposed as a central data source to provide any required gain switching of the flight control system for all three stability augmentation axes plus their outer loops, although but one axis is disclosed as illustrative of any of the three axes systems.

The multiple division fixed-gain system, wherein each division has a fixed gain, and its associated flight condition identifier is considered to be the best compromise between performance and complexity for the completely adaptable system. This concept also has growth potential to handle problems brought about by either further expansion in aircraft performance envelopes or alterations in the aircraft performance specifications.

Referring to FIGURE 1, it shows, for example, the multiple-level, fixed-gain controller provided for pitch axis control of an aircraft. In the general arrangement 10, block 11 represents the source of command signal. Such signal may be derived from a manually operable stick force signal source 11 which signal is supplied over transmission means 12, a lag device 13, transmission means 14, to a signal summing arrangement 15. The summing arrangement 15 additionally receives a craft normal acceleration signal from sensor 17 means of transmission means 18. A third source of control signal is provided by a craft pitch rate sensing device 21 which may be a conventional pitch rate gyro which has its output signal supplied by transmission means 22, high pass network 23, transmission means 24, transmission means 25, fixed gain device 26, transmission means 27, to the summing arrangement 15. If the signals be electrical in character, the summing arrangement may be a conventional parallel summing network. The output of summing arrangement 15 is supplied by transmission means 30 to a variable gain device 31. The output of the variable gain device 31 in turn is supplied by transmission means 32 to a second summiing arrangement 33. A second input to celeration signal from sensor 17 by means of transmission means 22, transmission means 34, fixed gain device 36, transmission means 37 to summing arrangement 33. A third input to summing arrangement 33 is provided by transmission means 24, transmission means 39, fixed gain device 41, transmission means 42 to summing arrangement 33.

Similarly, the summing arrangement 33 may be either a conventional parallel summing or series summing network, if the signals be electrical in character. The output of summing arrangement 33 is supplied by transmission means 43 to a second variable gain device 44 having its output supplied by transmission means 46 to a third summing arrangement 47. A second input to summing arrangement 47 is provided by transmission means 24, transmission means 49, fixed gain device 50, transmission means 51, to summing arrangement 47. The output of summing arrangement 47 is supplied by transmission means 53 to a combined band rejection and actuator device 54 with the output of the actuator portion being supplied by transmission means 59, which may be mechanical in nature, to a control surface such as an elevator surface 60 of an aircraft. In the band rejection and actuator 54, the third factor $(.05S+1)$ in the denominator of the transfer function indicates that this actuator operates on a closed loop basis so that impliedly the position of the elevator surface is fed back into the input to device 54.

Reference is now made to FIGURE 2 which shows in detail the flight condition identifier or the gain control arrangement, e.g., the control of the ratio of output to input for the variable gain devices 31 and 44 of FIGURE 1. The arrangement in FIGURE 2 provides for the multiple-level fixed-gain in the controller arrangement of FIGURE 1. Alternatively, FIGURE 1 may be referred to as the command control stabilization section, and FIGURE 2 may be referred to as a flight condition identifier.

The flight condition identifier will automatically determine in which of the three possible flight regimes the aircraft is being flown and will cause adjustment of controller gains, $K_a$, $K'_4$, to realize the proper response characteristics such as surface effectiveness, $M_\delta$ from control surface operation. Alternatively, the arrangement of FIGURE 2 may merely identify the flight condition and the pilot of the craft may manually adjust the gains in accordance therewith. It can also adjust other parameters if advantageous.

In FIGURE 2, the output of the normal accelerometer sensor 17, such as in feet per second squared, is also supplied by transmission means 63 to a summing arrangement 64. The craft angular pitch rate sensor 21 also through a high pass arrangement 65 and transmission means 66 applies a second input to summing arrangement 64. The output of arrangement 64 is supplied through transmission means 67 to band pass network arrangement 68 having in turn its output supplied by transmission means 69 to an absolute value circuit 70, such as a full wave rectifier, for electrical signals. The output, termed $Z\alpha$, or actual normal acceleration ($Z\alpha$ is lift curve slope, partial of normal acceleration with respect to angle of attack, $\alpha$, see table), of circuit 70 is supplied by transmission means 71, 72 to summing arrangement 73. The output of summing arrangement 73 is supplied by transmission means 74 and lag device 75, such as a first order lag network, transmission means 76 to a hysteresis element 77 having a slight threshold as shown. The hysteresis element 77 can be a polarized relay or other suitable electronic device and has an output either 0 or say +10 units, depending upon the signal on transmission means 76. This output is supplied to transmission means 78.

The position or displacement from normal of the elevator surface 60 is supplied through a compensating arrangement 80, transmission means 81 to a summing arrangement 82. The angle of attack, $\alpha$, of the aircraft is sensed by arrangement 84 which has its output signal supplied through transmission means 85 to summing arrangement 82. The output of summing arrangement 82 is supplied by transmission means 86 to a second order band pass network 87 having in turn its output supplied by transmission means 88, absolute value circuit 89, transmission means 90, gain device 91, transmission means 92, to a summing arrangement 93. The output of summing arrangement 93 is supplied by transmission means 94, first order lag device 95, transmission means 96, to a second hysteresis element 97 which supplies its output to transmission means 104.

The output on transmission means 71 from absolute value circuit 70 is also supplied through sub-transmission means 98 to summing arrangement 93 with the signs on transmission means 92, 98 being opposite as shown. Similarly the output from absolute value circuit 89 is supplied by transmission means 90, sub-transmission means 99, gain device 101, transmission means 102, to summing arrangement 73 with the signs on the input to the summing arrangement 73 and all other summing arrangements as shown.

The output from hysteresis element 77 appearing on transmission means 78 and the output from hysteresis element 97 on transmission means 104 are supplied to a lag arrangement 105 comprising amplifier 106, integrating motor 108 and feedback device 110. The inputs on transmission means 78, 104 are supplied to the amplifier 106. As indicated above, the separate output of either elements 77, 97 is 0 or 10, the sum of the two inputs on amplifier 106 thus may be 0, 10, or 20 volts or similar electrical quantity. The output of amplifier 106 supplied by conductor 107 to the integrator 108 which may be of the motor type. The integrator 108 through a mechanical drive shaft 109 positions a feedback signal generator 110 having its output supplied via conductor 111 to the input side of amplifier 106.

The output shaft also 109 drives a plurality of sliders of gain potentiometers 112, 116. In the present instance, motor shaft 109 operates a pair of sliders 114, 118 of voltage dividing potentiometers 112, 116 having respectively resistors 113, 117. The potentiometer 112 may be referred to as the variable gain device 31, FIGURE 1, and the potentiometer 116 may be the variable gain device 44 of FIGURE 1. Thus the inputs on signal transmission means 30 supplied to variable gain device 31 is modified by the operation of motor shaft 109 and has its output $K_a$ supplied on transmission means 32. Similarly, the signal transmission means 43 supplies a signal to potentiometer 116 and the output $K'_4$ therefrom appears on transmission means 46.

FLIGHT CONDITION IDENTIFICATION

Preceding sections have described a control system for the pitch axis which utilizes discrete gain controller settings, one for each of three flight regimes into which the total flight envelope is divided. These regimes have been related to the significant airframe parameter of control surface effectiveness, $M_\delta$. The problem is identification of $M_\delta$, or of some equivalent parameter.

Now a number of methods may be considered for this function. The oldest (and least desirable) method would be to use a combination of static and dynamic pressures to develop a schedule. The most obvious drawback, from the standpoint of meeting the adaptability objectives of the subject system, is the required tailoring of this approach to the specific airframe. The required tailoring is due largely to the fact that the stability derivative (which is a perturbation constant) is not measured directly. It should be noted, however, that the required degree of tailoring is a function of the required accuracy of the measurement; and the proposed system, contrary to many of the older controllers, is designed to minimize dependence on accurate airframe data. For example, the accuracy desired for the present system is to determine $M_\delta$ within about +100% and −50% of the actual value.

The proposed concept for flight control identification of control surface effectiveness such as elevator effectiveness, $M_\delta$, is based on the aircraft short period normal force equation for an aircraft, implemented in FIGURE 2:

$N_a = Z\alpha\alpha_t + Z_\delta\delta_e + l_a\ddot{\theta}$, derived from established equations, published, see Bureau of Aeronautics Report AE–61–4II, Dynamics of the Airframe, Chapter III, Sec. 7, Eq. III–24.

where $N_a$=linear acceleration normal to the attitude of the craft sensed or measured, $l_a$ feet forward of the center of gravity (ft./sec.²), by an accelerometer.

$Z\alpha$=normal acceleration due to changes in one unit of angle-of-attack, ft./sec.².

$\ddot{\theta}$=pitch angular acceleration, rad./sec.².

$Z_\delta$=normal acceleration due to one unit of elevator deflection, $\delta_e$, ft./sec.².

The significant thing about this short period normal force equation, which includes no slow changes, no trim changes, is the fact that both stability derivatives, $Z\alpha$, $Z_\delta$ in it tend to vary linearly with control surface effectiveness, $M_\delta$. As between $Z\alpha$ and $Z_\delta$, $Z\alpha$ is the dominant term of the force equation. The relationship between the dominant force term, $Z\alpha$, and the moment term $M_\delta$, was examined for four different aircraft and shows that identification of the force term, $Z\alpha$, alone is an adequate indication of control surface effectiveness, $M_\delta$, i.e. within tolerable +50% accuracy.

The principal action therefore of the FCI is to determine the relative value of $Z\alpha$ of the force equation with respect to two intermediate values $Z\alpha_1$ and $Z\alpha_2$ by comparing sensed magnitudes of normal acceleration and angle-of-attack of the force equation. The results of these comparisons in effect divide the total flight envelope of control surface effectiveness, $M_\delta$ into three regions. These three regions are shown in the table below.

The proposed implementation of the flight condition identifier (FCI) is shown in FIGURE 2. The FCI, by virtue of the bandpass filters indicated in FIGURE 2, performs its evaluation function in the frequency range between the long period and trim conditions of the sensed variables and the high frequency region where structural effects may predominate. In short, the filtering assures validity of the short period normal force equation discussed above which is the basis for design of the FCI.

| General Flight Condition | Associated Conditions Given in Ref. 1 | $M_\delta$ Range (radian/sec.²) | $Z_\alpha$ Range (ft./sec.²) |
|---|---|---|---|
| High Control Surface Effectiveness. | Mach 0.8, 0 Alt.<br>Mach 1.2, 0 Alt.<br>Mach 1.6, 15K Alt. | $-M_\delta>30$ | $-Z_\alpha>1{,}500$ |
| Medium Control Effectiveness. | Mach 2, 45K Alt.<br>Mach 2.5, 60K Alt. | $30>-M_\delta>9$ | $1{,}500>-Z_\alpha>400$ |
| Low Control Surface Effectiveness. | Mach 0.17, 0 Alt.<br>Mach 0.3, 15K Alt.<br>Mach 0.6, 45K Alt. | $-M_\delta<9$ | $-Z_\alpha<400$ |

The elevator position, $\delta_e$, and high-passed pitch rate inputs correct for $Z_\delta$ and accelerometer position effects (due to its being away from the center of gravity), respectively. Because these are minor corrections, the value of $Z_\delta/Z\alpha$ (essentially constant) and $l_a$ used in the device are not expected to require adjustment between aircraft within the subject class. The effect of local angle-of-attack, $\alpha$, at the sensor due to pitch angular rate for a sensor 30 feet ahead of the center of gravity was evaluated and found negligible.

The absolute value circuits enable the device to correctly correlate the sense of the output logic with the measured value of $Z\alpha$ for both positive and negative inputs.

The gain settings $Z\alpha_1$, and $Z\alpha_2$ as evident from the chart FIGURE 2 determined the desired boundaries between the selected flight regions. These gains are not expected to change between the subject aircraft types, as evidenced by the fact that the $Z\alpha$ ranges examined for three typical aircraft were found to lie within the given $Z\alpha$ range of −63 to −5400 ft./sec.$^2$. Hence, a single adjustment in controller loop gain, performed in the interface between the controller and the specific aircraft servo, should be adequate.

The error signals, $e_1$, on 96 and $e_2$, on 76 generated by the comparison of measured $Z\alpha$ with the preset values, are applied to hysteresis circuits which perform the final gain switching via a lagged (to avoid transients) gain adjusting element 107, 108.

The strong feature of this flight condition identifier 61 is that its function is independent of the nature of the input or disturbance. Hence, proper evaluation is performed for both pilot commands and gusts.

In FIGURE 3, an alternative arrangement is shown for providing a single input to amplifier 106 FIGURE 1 to replace the existing structure that provides two inputs to amplifier 106. In FIGURE 3, for simplicity some gain devices have been omitted, but the signals on 71 and 90 are the same as in FIGURE 1, the output on conductor 90 is supplied to a computed gain device 121, $Z\alpha$. Also the output on 71 is supplied to a summing device 124 to receive a second input from gain device 121. The output from device 124 controls an integrator 127 having its output applied to amplifier 106 by transmission means 128. A feedback from integrator 127 is applied to gain device 121 by transmission means 128, 130 to adjust its gain. In this sense the gain of $Z\alpha$ is computed whereas in FIGURE 1, $Z\alpha$ and $Z\alpha_2$ are fixed gains.

In summary, the proposed flight condition identifier 61 offers a reliable and simple means of categorizing the critical aircraft characteristics with minimal adjustment to the particular aircraft type. This device may be applicable to all three control axes plus their outer loop functions.

OPERATION

Referring to FIGURE 1, the pitch stability augmentation control system utilizes an electrical signal from the pilot stick as an input, and the feedback signals of pitch rate and normal acceleration. The feedback signals are shaped and summed to form the unfiltered servo actuator position command signal. Variable values for gains $K'_4$ and $K_a$ compensate for gross changes in the aircraft's dynamic characteristics and control surface effectiveness.

The desired change in response speed to the manual input between the maneuvering and cruise mode is accomplished by proper selection of the time constant of the filter 13. All input signals to the elevator actuator are applied through a sharp-cutoff, low pass filter 54 which in combination with the actuator lags keeps the open loop gain of the system (including the bending modes) below unity at all frequencies beyond 30 radian seconds. Using this filtering, the system requires no modification to override the excitation of bending modes when installed in any type of aircraft provided that the bending frequencies are greater than 30 radians per second.

The flight condition identifier 61 FIGURE 2 (FCI) operates on the principle that, given signals proportional to angle-of-attack and normal acceleration, the region of the total flight envelope in which the aircraft is being operated can be identified for purpose of control law variation. By varying the control laws in accordance with an easily computed signal, the simplicity of a fixed gain control system is to a large extent preserved.

The flight condition identified is based specifically on the short period normal force equation for the aircraft. Perturbation values of angle-of-attack, derived angular acceleration, normal acceleration, and elevated deflection are compared to determine the existing flight condition of the aircraft relative to three divisions of the total aircraft flight envelope. The aircraft flight envelope is divided on the basis of control surface effectiveness or its approximate equivalent, normal acceleration due to angle-of-attack. The three discrete outputs of the FCI from the hysteresis elements are used to set values for the pitch stability augmentation system variable gains $K'_4$ and $K_a$.

The FCI outputs are also available to change gains if required for the lateral axis stability augmentation system plus any altered loops which might benefit from an approximate knowledge of flight condition.

The operation also may be otherwise stated as follows: In FIGURE 2, for a given manual input signal in FIGURE 1, if normal acceleration relative to angle-of-attack is high, then the $M_{\delta e}$ or control surface effectiveness is large. In this case less actual surface displacement, $\delta_e$, should be applied.

Again, if relative value of normal acceleration and angle-of-attack, $\alpha$, is medium, the gain should be medium and elevator surface 60 should be displaced accordingly.

If the relative magnitude of normal acceleration to angle-of-attack, $\alpha$, be low, the control surface effectiveness, $M_{\delta e}$, is less and more elevator displacement should be provided for the given control signal.

The above operation is so irrespective of whether the input signal is manually provided or whether it is due to a disturbance sensed by the pitch rate gyro or normal accelerometer.

In FIGURE 2, sliders 114, 118 are at the top, for maximum output, for low $M_\delta$, control surface effectiveness. Thus as airspeed increases, normal acceleration relative to angle-of-attack changes increases, and surface displacement for a given command signal should be decreased. A positive output to the hysteresis elements would call for decrease in gain. Zero input to the hysteresis elements, causes reverse operation of integrator 108 due to the feedback signal from generator 110.

Having thus described the novel control system with its flight condition identifier in connection with the pitch channel of a craft it should be understood that the system may be applied to the bank control channel as well and also to the yaw control channel. Thus while the one embodiment of the invention has been illustrated and described in detail it is to be expressly understood that the invention is not limited thereto. Thus, various changes can be made in the design and arrangement of the parts without departing from the spirit and scope of the invention as the same will now be understood by those skilled in the art.

What is claimed is:

1. In flight control apparatus for an aircraft having attitude changing means and a large airspeed and/or altitude range, in combination: first means providing a control signal to initiate change in attitude by operation of said attitude changing means; second means receiving said signal; motor means controlled by said receiving means and positioning the attitude changing means; and means responsive to the resulting changes in angle-of-attack and normal acceleration of said aircraft caused by operation of the motor means, wherein angle of attack and normal acceleration are terms in the normal force equation of the aircraft for changing the gain, e.g., ratio of output to input of said receiving means, to vary the operation of the attitude changing means to hold substantially constant the control effectiveness of said attitude changing means for the given first signal over a portion of the speed range of the craft.

2. The apparatus of claim 1 wherein the motor means is arranged to displace the attitude changing means in accordance with the magnitude of the control signal.

3. In a command control stabilization control system for an aircraft having means providing an electrical, system operation initiating, control signal and normal acceleration and pitch rate feedback electrical signals for positioning an elevator control surface of an aircraft, in combination gain adjusting means connected to said system for varying the gain or ratio of output to input of such system for a given initiating control signal during a change in airspeed said means comprising means responsive to angle-of-attack of said aircraft providing a signal and signal providing means responsive to normal acceleration of said aircraft thereby tending to compensate for the varying aerodynamic effectiveness of the surface at different airspeeds.

4. The apparatus of claim 3, said gain adjusting means including a first means for modifying the signal in accordance with the craft angle-of-attack in accordance with the gain quantity $Z\alpha_1$; means for modifying the signal in accordance with the angle-of-attack in accordance with a second gain quantity $Z\alpha_2$; means combining the normal acceleration signal of the craft with the first modified angle of attack quantity signal thereby providing a step output; means combining the second modified angle of attack quantity signal with the normal acceleration signal for supplying a second step output; means combining the two step outputs; means controlled by the combined two outputs in accordance with the presence or absence thereof and positioning two gain devices in either of one of three positions to vary the gain of said system.

5. In control apparatus for an aircraft operable over a wide airspeed regime and having signal providing means, signal responsive means, and motor means operating an elevator surface or pitch attitude changing means of the craft and controlled by the signal responsive means, means connected to the control apparatus for varying the gain or ratio of output to input of the signal responsive means in accordance with three regions of control surface effectiveness and thus the effectiveness of the attitude changing means for said signal in accordance with normal acceleration of the craft due to changes in angle-of-attack including means responsive to craft angle of attack and craft normal acceleration in opposing relation thereby counteracting the variation in aerodynamic effectiveness of the surface over the speed regime.

6. The apparatus of claim 5, wherein the gain of the signal responsive means is varied at three division points that divide the aircraft speed regime.

7. The apparatus of claim 6, wherein the gain change at the division points is effected by means including means comparing the craft sensed normal acceleration and a desired normal acceleration for an angle of attack.

8. In control apparatus for an aircraft operable over a wide airspeed range and having first means for operating a control surface of the aircraft, gain changing means connected to the first means having means sensing normal acceleration of the craft in flight, means sensing angle-of-attack, means providing a desired normal acceleration for the angle-of-attack, and means comparing the actual and desired normal acceleration and upon an inequality therein said gain changing means altering the gain of the first means to substantially compensate for the varying aerodynamic effectiveness of the control surface over the airspeed range.

9. In control apparatus for a steerable craft having attitude changing means, in combination: first signal providing means responsive to craft normal acceleration; second signal providing means responsive to craft angular rate about the axis controlled by the attitude changing means, means combining said signals, motor means controlled by the combining means and positioning the attitude changing means, and comparing means responsive to the relative magnitudes of normal acceleration and angle of attack of the craft resulting from operation of the attitude changing means, and upon inequality therein varying the gain of said combining means during changes in craft airspeed or altitude, thereby tending to compensate for the varying aerodynamic effects on the craft.

10. In control apparatus for an aircraft having pitch attitude changing means, in combination: first signal providing means responsive to craft normal acceleration; second signal providing means responsive to craft angular rate about its pitch axis; means combining said two signals; motor means controlled by the combining means positioning the attitude changing means; means responsive to angle of attack of the craft and further means responsive both to angle of attack and craft normal acceleration connected to the combining means and modifying the gain, e.g., ratio of output to input of said combining means in accordance with the relative changes in normal acceleration due to changes in angle of attack resulting from operating of the attitude changing means.

11. A method of compensating the control movement of a control surface of an aircraft equipped with operating means for the surface for varying aerodynamic effectiveness during changes in airspeed, comprising: flying the aircraft with a control surface displaced by the operating means; obtaining the angle of attack of the aircraft; obtaining the normal acceleration of the aircraft; determining a desired normal acceleration for the obtained angle of attack; comparing the relative magnitude of the normal acceleration obtained with the determined normal acceleration; and varying the gain of the operating means for the control surface if the determined normal acceleration be different from the obtained normal acceleration.

12. The method of claim 11, wherein the change in gain is effected in fixed increments.

13. The apparatus of claim 11, wherein the difference between the obtained normal acceleration and the determined acceleration must attain a significant difference before the change in gain is effected.

14. In control apparatus for an aircraft having pitch attitude changing means, in combination: first means providing a control signal; signal responsive means having gain changing devices therein controlled by said signal; motor means for operating the attitude changing means controlled by the signal responsive means and positioning the attitude changing means in accordance with the magnitude of said control signal to modify control effects of said first signal on said signal responsive means; further means providing a signal corresponding to craft normal acceleration and a signal corresponding to angle of attack of the craft and connected to the gain changing devices in said signal responsive means and varying the gain thereof in accordance with the difference of the normal acceleration and angle of attack signals to maintain a desired relationship between craft normal acceleration and angle of attack for displacement of said attitude changing means for the same magnitude of the control signal for varying flight conditions such as airspeed and altitude.

15. In control apparatus for an aircraft having attitude changing means, in combination: first means providing a control signal; signal responsive means controlled by said signal; motor means for operating the attitude changing means controlled by the signal responsive means and positioning the attitude changing means in accordance with said control signal to modify the control effects of said first signal; means responsive to normal acceleration of said aircraft; means responsive to angle of attack of said aircraft; and further means responsive to said last two named means and connected to the signal responsive means and varying the gain or ratio of output to input thereof tending to compensate for varying aerodynamic effects to maintain a desired control effectiveness of the attitude changing means on said aircraft.

16. In control apparatus for an aircraft having angularly displaceable control surfaces, in combination: first means providing a control signal; signal responsive means controlled by said signal; motor means for operating the control surfaces controlled by the signal responsive means and positioning the control surfaces in accordance with the magnitude of said control signal; and further means providing a signal corresponding to normal acceleration and a signal corresponding to craft angle of attack in accordance with the normal force equation for an aircraft and connected to the signal responsive means and varying the gain or ratio of output to input thereof in accordance with the relative magnitudes of the normal acceleration and angle of attack of the craft to substantially maintain constant the control moment of said surface despite changes in airspeed of the aircraft.

References Cited

UNITED STATES PATENTS

| | | | |
|---|---|---|---|
| 2,974,908 | 3/1961 | Platt | 244—77 |
| 3,095,169 | 6/1963 | Osder | 244—77 |

MILTON BUCHLER, *Primary Examiner.*

B. BELKIN, *Assistant Examiner.*